May 27, 1947.  F. W. FRINK  2,421,023
MEANS FOR DEFINING RADIO COURSES
Filed March 10, 1942  3 Sheets-Sheet 1

INVENTOR.
FREDERICK W. FRINK
BY Paul R. Adams
ATTORNEY

INVENTOR.
FREDERICK W. FRINK
BY *Paul R. Adams*
ATTORNEY

May 27, 1947.    F. W. FRINK    2,421,023
MEANS FOR DEFINING RADIO COURSES
Filed March 10, 1942    3 Sheets-Sheet 3

INVENTOR.
FREDERICK W. FRINK
BY Paul R. Adams
ATTORNEY

Patented May 27, 1947

2,421,023

UNITED STATES PATENT OFFICE 2,421,023

MEANS FOR DEFINING RADIO COURSES

Frederick W. Frink, East Orange, N. J., assignor to Federal Telephone and Radio Corporation, a corporation of Delaware Application March 10, 1942, Serial No. 434,067

5 Claims. (Cl. 250—11)

This invention relates to improvements in guiding systems and more particularly to such systems as applied to radio ranging and instrument navigation of aircraft.

A currently accepted method of defining a course for aircraft is to radiate energy characterized by a first signal predominantly to one side of the desired course and energy characterized by a second signal predominantly to the other side of the course. In accordance with one of the systems following this method, as more fully described in the copending application Serial No. 303,206, filed November 7, 1939, of A. Alford, these two signals, are continuously radiated one either side of the course and represent carrier energy modulated by two rather low audio frequencies. In order to follow such a course, it is necessary to provide appropriate audio filtering equipment on the airplane to distinguish the relative magnitude of each of these two signals, whereby a reading may be obtained to determine the position of the aircraft with respect to the course. In practice, this system is open to the objection that the receiving equipment must necessarily be relatively heavy and expensive due mainly to the requirement for the audio frequency filters.

It is accordingly an object of the invention to provide an improved method and means for defining a radio course whereby the size, cost, and weight of the receiving equipment required on the aircraft is substantially reduced.

Another object is to provide an improved aircraft guiding system wherein visual indicating means may be employed to enable the pilot of the aircraft to determine his relative position with respect to the course defined by the guiding system.

Other objects and various further features of novelty and invention will hereinafter be pointed out or will become apparent to those skilled in the art from a reading of the following specification in conjunction with the drawings included herewith. In said drawings—

Figure 2:
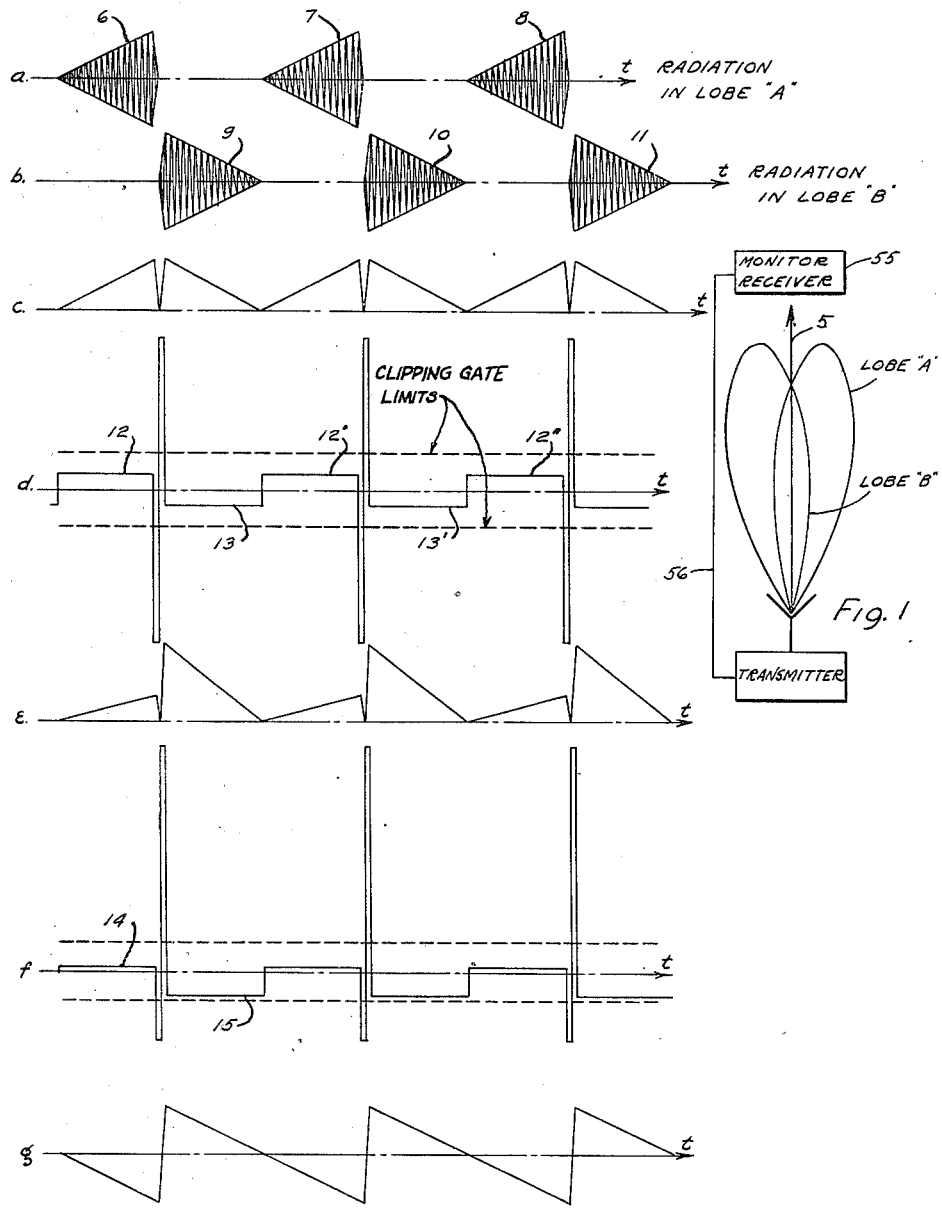
Figure 3:
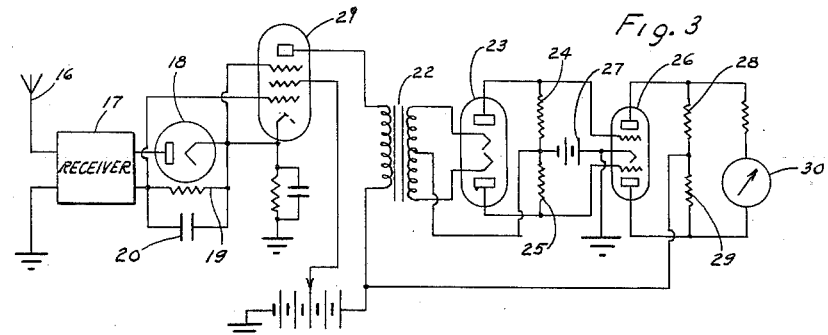
Figure 4:
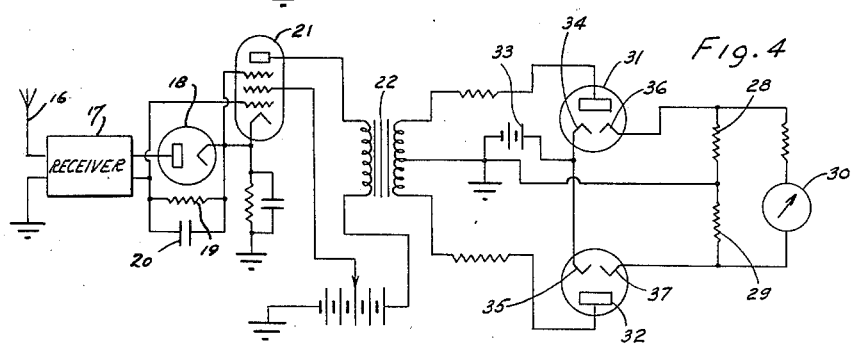
Figure 6:
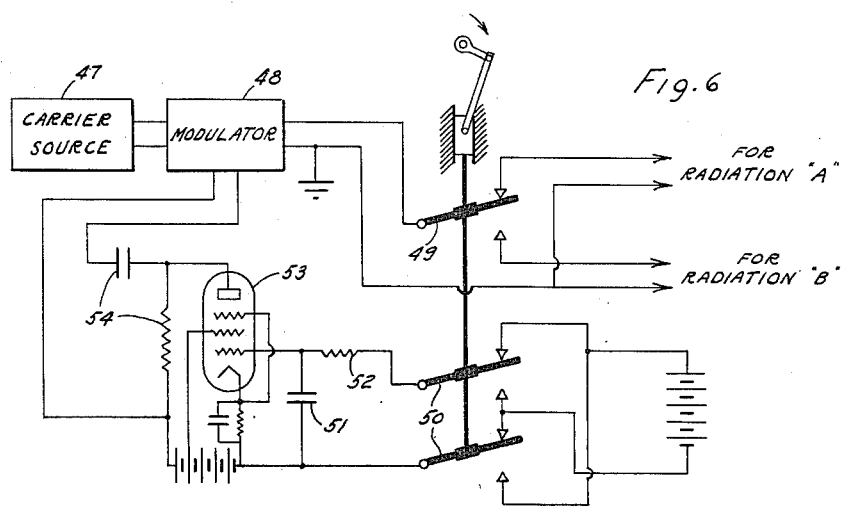
Figure 5:
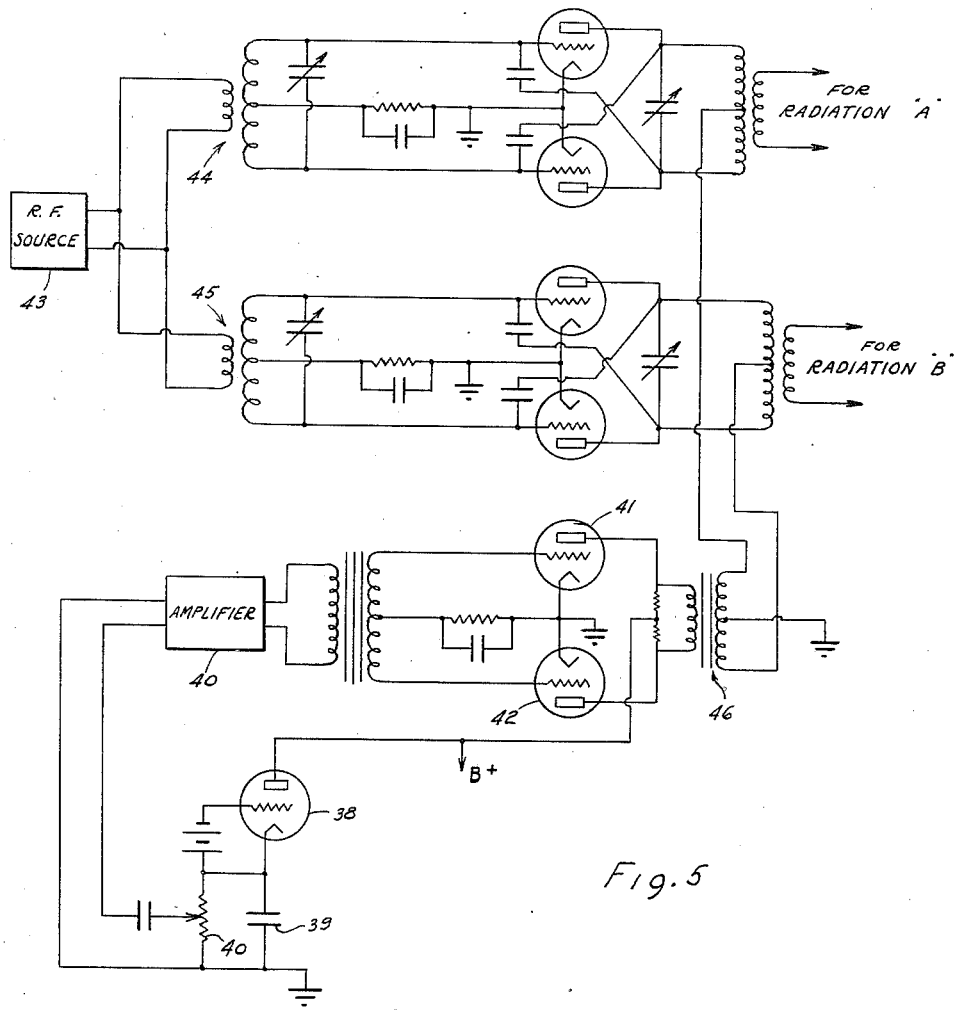

Fig. 1 indicates schematically a manner in which signals may be radiated to define a course in accordance with the invention;

Curves a through g of Fig. 2 graphically illustrate certain voltage and other wave conditions produced by apparatus in accordance with the invention;

Figs. 3 and 4 are schematic circuit diagrams of preferred receiving apparatus for detecting a course radiated in accordance with the invention; and Figs. 5 and 6 are circuit diagrams of preferred apparatus for defining a course in accordance with the invention.

Broadly speaking and with reference to the diagram of Fig. 1, the invention contemplates the definition of a radio course 5 by radiating generally to one side of the course (as indicated by the lobe "A") carrier energy characterized by a first signal, and radiating generally to the other side of the course (as indicated by lobe "B") energy characterized by a second signal. These two signals are so characterized that when they are simultaneously or concurrently differentiated, a signal of one polarity characteristic of the first-mentioned of these signals and a signal of opposite polarity characteristic of the second mentioned of these signals will be obtained whereby a subsequent comparison of relative magnitudes may be effected.

In accordance with a preferred embodiment of the invention, energy is radiated for a short interval of time to form lobe "A" alternately with another interval of radiation forming lobe "B," and each of these periods of alternate radiation is of equal duration. In order to obtain maximum contrast between the two signals modulating the carrier radiated in lobes "A" and "B" respectively, it is proposed that one of these signals be characterized by a relatively long and gradual increase in magnitude, whereas the other is characterized by a relatively long and gradual decrease in magnitude. Preferably, these gradual changes in magnitude occur at the same rate whereby upon differentiation (provided the same strength of signal be received for each of these signals) a constant magnitude signal in one polarity sense will be detected equal and opposite to another constant magnitude signal.

The curves of Fig. 2 will serve clearly to illustrate the operation of such a system. In this figure, curves $a$ and $b$ represent respectively radiation in lobe "A" and radiation in lobe "B," plotted as a function of the same time scale in each instance. It will be observed that radiation in lobe "A" is a periodically recurrent succession of wave trains 6, 7, 8, characterized for the most part by a gradual and relatively prolonged increase in magnitude and terminated by a very abrupt change in magnitude. In contrast, another succession of wave trains 9, 10, 11, is radiated in lobe "B" and characterized essentially by a rather abrupt and almost instantaneous increase from zero to full magnitude, followed thereafter for almost the entire duration of each wave train by a substantially uniform decrease in magnitude at the same rate of change as the increase in magnitude of signals of lobe "A."

If the series of wave trains in lobe "A" is received with the same magnitude as the series in lobe "B," it is clear that the receiver is substantially on the course defined by the radiation pattern of Fig. 1. It is further clear that under these circumstances, and after appropriate detection of the overall envelope of received energy, this envelope will be of the general nature shown in curve c of Fig. 2. Now, in accordance with the invention, it is proposed that the signal thus obtained and characterized by the envelope of received energy be passed through a differentiating network whereby a series of relatively sustained and uniform square waves 12, 12', etc., will be obtained in one polarity sense to represent detection of the gradual slope of signals characterizing radiation in lobe "A." Concurrently, a corresponding series of relatively sustained square waves 13, 13', etc., will be obtained in opposed polarity sense for each gradual decrease in magnitude corresponding to the greater portion of wave trains radiated to form lobe "B." By supplying these alternate square waves 12 and 13 to an indicating device responsive to reversals in polarity and suitably damped, it is clear that if the magnitude of the square waves 12, 12', etc., be equal to that of square waves 13, 13', etc., a balance or zero reading may be taken off the indicator. Since the trailing ends of the wave trains 6, 7, 8 and the leading edges of wave trains 9, 10, 11 are characterized by relatively fast changes in amplitude, it is clear that the differentiating means will serve to generate relatively short high magnitude impulses for each of these fast changes. These short impulses may be eliminated from the signal applied to the indicating meter whereby that meter may be able to determine a more correct indication of the relative magnitudes of square waves 12 and 13.

Should the receiving apparatus be off course, the detected envelope may be of the form shown in curve e of Fig. 2, wherein every other gradual change in amplitude is relatively great due to the relative predominance of signals characterizing one lobe with respect to those of the other. Due to such a mismatch of the gradual slopes, the output energy from the differentiator may be characterized first with a relatively small magnitude square wave 14, indicative of the gradual increase in magnitude of the weaker signals of radiation in lobe "A"; and then a square wave 15 of somewhat larger amplitude but opposed polarity sense will be obtained as an indication of the relatively strong amplitude of received signals characterizing lobe "B" radiation. An indicating device of the above-mentioned nature will, under these latter conditions, be urged to respond predominantly to the signals characterizing radiation in lobe "B," as will be clear.

A preferred detection circuit for indicating the relative magnitude of radiation in lobe "A" with respect to that of lobe "B," is shown in Fig. 3. In accordance with this circuit, energy detected by an appropriate antenna 16 and receiver 17 is supplied to a diode detector 18 having appropriate smoothing means comprising a resistor 19 and by-pass capacitance 20 connected across the output thereof. It is thus clear that when the detecting apparatus is in a field of radiation of the above mentioned nature, voltages set up across the resistor 19 may be of the nature shown in curves c and e of Fig. 2, depending upon the location of the detecting apparatus. In the form shown, the detected signal appearing across resistor 19 is amplified by pentode 21 and then applied directly across the primary of a differentiating transformer 22, whereby the secondary may yield an output signal of the nature above discussed in connection with curves d and f of Fig. 2. The secondary of transformer 22 is connected as shown to double diode 23 whereby a first negative voltage will appear across output resistor 24, and then alternately a succeeding negative voltage will appear across output resistor 25 as the output of transformer 22 successively changes in polarity. In order effectively to eliminate the shorter and undesirable large impulses obtained by differentiation in transformer 22, the voltages appearing across resistors 24 and 25 are applied alternatively to the control grids of double triode 26, which grids are appropriately biased by means of battery 27, whereby one of the triode sections of tube 26 may be rendered non-conductive for any signal above a given magnitude in either polarity sense in the output of transformer 22, thus effectively clipping the amplitude of current variations produced in the plate circuit and corresponding to these short impulses. In the form shown, output from double triode 26 is applied to load resistors 28, 29 across which an indicating device 30 is connected. Preferably, resistors 24 and 25 are of sufficiently high resistance to avoid producing substantial change in the wave shape of voltage developed across the secondary of transformer 22.

Another preferred form of receiving apparatus is illustrated in Fig. 4 wherein the circuit connections of Fig. 3 up to transformer 22 will be recognized. The embodiment of Fig. 4 merely illustrates an alternate form of limiting device for defining the gate for substantially eliminating any effect of the relatively large and short impulses shown in curves d and f of Fig. 2. This alternate circuit involves the connection of terminals of the secondary of transformer 22 respectively to anodes of double diodes 31 and 32. In order to obtain the desired limiting action, a biasing battery 33 is connected to the cathode circuits 34, 35 of each of tubes 31 and 32 so as preferably to apply a given positive potential to each of them. It is clear that all voltages applied to the anodes of tubes 31 and 32 and less than the limiting voltage supplied by battery 33 will be conducted by way of additional cathodes 36, 37 to the indicating circuit 30, which may be of the same general nature as shown in Fig. 3. For voltages larger than the limiting condition imposed by the battery 33, the circuit comprising cathodes 34 and 35 will represent a short circuit and no current will be passed to the indicating circuit. Thus, the undesired large impulses may be effectively eliminated, and a true course reading may be obtained with relative simplicity.

Simplicity may also characterize the equipment necessary for transmission of a course of the above indicated nature, for all that need be supplied is a saw-tooth generating circuit and means for modulating energy transmitted in lobe "A" with one portion of the resultant saw-tooth and for modulating energy transmitted in lobe "B" with the remaining portion thereof. In the form shown in Fig. 5, the required saw-tooth is generated by a thyratron 38 having a small bias voltage between grid and cathode. When tube 38 becomes instantaneously conductive to pass a surge of current through condenser 39 in the cathode circuit thereof, a charge builds up across condenser 39, and a resistor 40 connected thereacross permits a gradual leakage off of this charge voltage. When the voltage across condenser 39 has dissipated to a predetermined level, depending upon the bias on the grid of tube 38, the latter will again become conductive, and the cycle of operation will be repeated. The wave form generated in this manner, as appearing across resistor 40, may be of the nature indicated in curve *g* of Fig. 2, as will be clear. It is further clear that by appropriately adjusting the elements controlling discharge of tube 38, the decrease in condenser voltage between charging impulses may be only a fraction of the total voltage across the condenser whereby a discharge curve, which will ultimately be used to modulate carrier energy for radiation, may furnish a modulation envelope characterized by substantially linear outlines.

In the form shown, the alternating-current component of this saw-tooth wave is suitably amplified by amplifier means 40 and then supplied by means of a transformer coupling to modulator tubes 41 and 42, operating in push-pull. Output thus obtained is then employed alternately to supply plate voltage to amplifiers energizing the appropriate antenna systems for radiation as lobe "B" alternately with radiation as lobe "A," as will be pointed out. In the form shown, carrier power is supplied to the respective antenna systems from a suitable source 43 into two channels designated generally 44 and 45 for ultimate supply to the antenna systems for radiation in the respective directions indicated by lobes "A" and "B." Each of channels 44 and 45 includes push-pull amplifier means. It will be noted that no steady means have been provided for furnishing plate voltage for these power amplifiers. This plate voltage is preferably supplied only from modulating tubes 41 and 42 by means of a transformer coupling 46. Preferably, the midpoint of the secondary of transformer 46 is grounded whereby voltages representing one half of the saw-tooth wave are employed as B supply for the push-pull power amplifiers, say, of channel 44, and voltages representing the other half of the saw-tooth are employed to furnish B supply to the push-pull amplifier means of channel 45. In this manner, it is clear that the amplifiers of channel 44 are operative alternately with those of channel 45 and that the desired modulation as depicted graphically in curves *a* and *b* of Fig. 2 is obtained.

An alternate and perhaps simpler arrangement for obtaining radiation of the same general nature as in the case of the circuit of Fig. 5, is shown in Fig. 6. In this latter circuit, carrier energy as supplied from a suitable source 47 is fed to a single modulating network which may be of the same nature as used in ordinary speech communication transmitters, and keying means 49 are provided for alternately energizing the antenna means producing lobe "A" and the antenna means producing lobe "B." The keying means are shown schematically as mechanical, but they may be of any known type including electronic switching means. Keying means 49 are synchronized with further keying means 50 for applying a charging voltage of one polarity to a resistance condenser network 51, 52 in one keying position and for applying a potential of opposite polarity thereto in the alternate keying position. By making the keying intervals small with respect to the time required to charge condenser 51, it is clear that a saw-tooth wave similar to that shown in Fig. 2 (curve *g*) will be obtained across condenser 51. In the form shown, this wave form is amplified by a pentode 53 and then supplied through suitable coupling means 54 to the modulator 48, whereby wave trains of the forms shown in curves *a* and *b* of Fig. 2 are alternately supplied to the radiation elements for alternately radiating lobes "A" and "B."

If there should for any reason be any dissymmetry as to relative magnitudes of transmitted wave trains, it is clear that errors in the resultant course may occur. In order to check against such an occurrence it is proposed that an automatic monitor receiver 55 (having a circuit as in Fig. 3 or Fig. 4 but with a push-pull D. C. amplifier substituted for indicator 30) be provided on the correct course and remote from the transmitting apparatus. Variations in the course would be immediately detected by the monitor which would then furnish from its D. C. amplifier a control signal indicative of any dissymmetry as to magnitude of course signals. This control signal is then preferably fed by means of a suitable transmission means 56 to the transmitter being there applied in opposite polarity to the grid return leads of the amplifiers of channels 44 and 45 of Fig. 5 so as to increase bias in one of these amplifiers and decrease it in the other, depending upon which radiation has been found by the monitor to be too large.

Although I have described my invention particularly in connection with the preferred forms shown, it is to be understood that many modifications, additions, and omissions may be made within the spirit and scope thereof as defined by the appended claims.

What is claimed is:

1. Radio course detection apparatus comprising receiving means including means for detecting the envelope of received wave trains, differentiating means coupled to said detecting means, limiting means comprising a pair of negatively biased electron discharge tubes connected in push-pull and having an input circuit coupled to said differentiating means and an output circuit, and indicating means connected to said output circuit and discriminatingly responsive to the average magnitude of signals of one polarity and to the average magnitude of signals of opposite polarity.

2. Apparatus for defining a radio course comprising means for generating a first series of signals characterized by a relatively slow increase and a relatively fast decrease in magnitude and means for generating a series of signals characterized by a relatively fast increase and a relatively slow decrease in magnitude, a source of carrier energy, means for modulating said carrier energy with output energy from said first-mentioned generating means, means for modulating said carrier energy with output energy from said second-mentioned carrier means, and radiating means coupled to each of said modulating means and radiating output energy from said first-mentioned modulating means in one direction and output energy from said second-mentioned modulating means in another direction.

3. Apparatus for defining a radio course comprising saw-tooth generating means, a source of carrier energy, means for modulating said carrier energy with output from said generating means, a first antenna means, a second antenna means, and means feeding energy so modulated and corresponding to substantially one half the voltage sweep of output from said generating means to said first antenna and means feeding energy so modulated and corresponding to substantially the other half of the voltage sweep of said generating means to said second antenna means.

4. Apparatus for defining a radio course comprising saw-tooth generating means including means for supplying a saw-tooth wave form symmetrically about an alternating-current axis, a source of carrier energy, a first modulating means modulating said carrier energy with portions of said saw-tooth wave form to one side of said axis, and a second modulating means modulating said carrier energy with portions of said saw-tooth wave form to the other side of said axis.

5. Apparatus according to claim 4 wherein each of said modulating means includes an electron discharge device having at least a cathode, a control grid and an anode wherein said source of carrier energy is connected between the grid and cathode of each said modulating means, said first-mentioned modulating means further including means connecting said saw-tooth generating means to the anode circuit thereof in a first phasal relation, said second mentioned modulating means further including means connecting said saw-tooth generating means to the anode circuit thereof in a second phasal relation opposed to said first-mentioned phasal relation.

FREDERICK W. FRINK.

REFERENCES CITED

The following references are of record in the file of this patent:

UNITED STATES PATENTS

| Number | Name | Date |
|---|---|---|
| 2,005,798 | Moser | June 25, 1935 |
| 2,093,885 | Gerth | Sept. 21, 1937 |
| 2,108,562 | Mabry | Feb. 15, 1938 |
| 2,198,445 | Wesselink | Apr. 23, 1940 |

FOREIGN PATENTS

| Number | Country | Date |
|---|---|---|
| 113,558 | Australia | July 24, 1941 |